Aug. 23, 1960 B. S. AIKMAN 2,949,740
AUTOMOTIVE VEHICLE TYPE BRAKE APPARATUS WITH PULSATING FEATURE
Filed Jan. 29, 1957
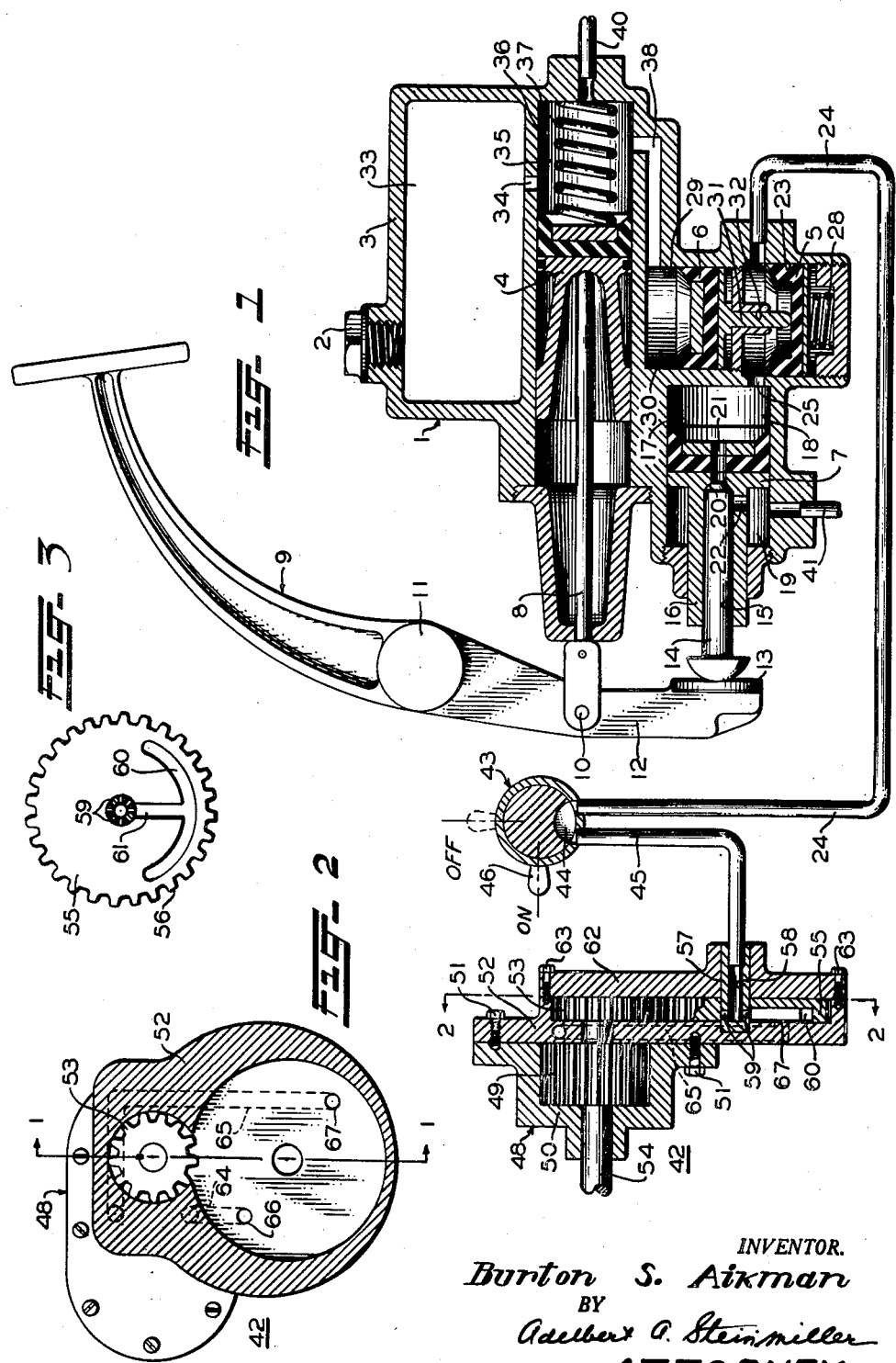
INVENTOR.
Burton S. Aikman
BY
Adelbert A. Steinmiller
ATTORNEY

United States Patent Office 2,949,740
Patented Aug. 23, 1960

2,949,740

AUTOMOTIVE VEHICLE TYPE BRAKE APPARATUS WITH PULSATING FEATURE

Burton S. Aikman, St. Petersburg, Fla., assignor to Westinghouse Air Brake Company, Wilmerding, Pa., a corporation of Pennsylvania Filed Jan. 29, 1957, Ser. No. 636,997

4 Claims. (Cl. 60—54.6)

This invention relates to brake control apparatus and more particularly to automotive brake control apparatus of the type employed on large trucks or similar vehicles.

In operation of automotive type brakes on slippery surfaces, it has been found to be true that a sliding wheel has the tendency to slip sideways, a condition that may prove to be dangerous. Various devices and types of apparatus have heretofore been proposed for preventing sliding or locking of automotive wheels; however, such devices have proved to be of high cost of construction and installation and often involving costly and complex additional construction to alter the brake equipment already supplied.

According to the invention, there is provided an automotive vehicle type brake apparatus wherein a brake application may be optionally, under the operator's control, either a conventional application or an automatically pulsating application, according to the type of application necessitated by the road conditions. The pulsating brake application is obtained by subjecting a piston to a pulsating oil pressure to oppose the foot-applied pressure on a brake foot pedal. The pulsating oil pressure acting on the mentioned piston is obtained via operation of a rotary valve gear associated with and driven by the usual vehicle engine lubricating pump to alternately supply oil first under the pump discharge pressure and then under normal crankcase pressure.

It is therefore the principal object of my invention to provide an inexpensive brake control apparatus which effects automatically a pulsating brake application to forestall possible wheel sliding.

Another object of my invention is to provide inexpensive brake control apparatus of simple construction adjustable as desired by the operator to provide selectively an automatic pulsating brake application for slippery road surfaces and a conventional sustained brake application for dry road surfaces.

Still another object is to provide an inexpensive brake control apparatus of simple construction so as to be easily adapted to operate with standard vehicle equipments to provide an automatic pulsating brake application when so desired.

These objects and other objects and advantages will become apparent from the following detailed description of the invention and from the accompanying drawing, in which Fig. 1 shows, partly in outline and partly in section, a portion of a hydraulic brake control apparatus embodying the invention, Fig. 2 shows a pump device partly in outline and partly in section with a rotary valve gear removed, and Fig. 3 shows a rotary valve gear in outline.

Description

As shown in the drawing of Fig. 1, the brake control apparatus is applied to the hydraulic type of automotive brake system comprising a hydraulic master cylinder device 1 filled with brake fluid through a filling port closed by a threaded cap nut 2. This master cylinder device comprises a casing body 3 containing an application piston 4, a cut-off valve 5 controlled by a cut-off piston 6, and a releasing piston 7.

The application piston 4 has a piston rod 8 which is connected to a foot pedal lever 9, as by a pin 10. Force is applied to the application piston 4 by pressure applied to the foot pedal lever 9, which pivots about a pivot pin 11 rigidly mounted on the vehicle frame. The lower portion 12 of the foot pedal lever has a contact plate 13 for contact with the outer end of a release plunger 14, the release plunger being slidably mounted in a bore 15 within a piston stem 16 of the releasing piston 7.

The releasing piston 7 is slidably mounted within a bore 17 and forms with the casing body 3 on the side opposite stem 16 a chamber 18, and on the stem side an annular chamber 19. The right end of the releasing plunger 14 is adapted when in a releasing position to seat on a seat 20 to close communication between chambers 18 and 19 through a port 21 extending through the piston 7 and a port 22 in the wall of the piston stem 16.

The cut-off valve 5 is in the form of a piston which operates slidably in a bore 23 and controls the supply of fluid to the chamber 18 from a fluid delivery conduit or pipe 24 which opens into bore 23, a port 25 connecting bore 23 to chamber 18. The cut-off valve 5 is biased upwardly by a spring 28 to a normal position in which the opening of delivery pipe 24 into bore 23 is blanked off as well as the port 25. The cut-off piston 6 is slidably mounted in a bore 29 coaxial to and opening into bore 23 and is operative downward by fluid under pressure in a chamber 30 at one side thereof to move the cut-off valve 5 downwardly against the spring 28 through the medium of a piston stem 31 slidably guided in a bore 32. The chamber 30 is supplied with fluid under pressure from a fluid reservoir 33, filled with fluid through the filling port closed by plug 2, thence through a port 34 to a bore 35 forming a chamber 36 housing a spring 37, and a passage 38.

The piping to the master cylinder device 1 consists of the hydraulic line 40 (which leads to the brake cylinders) connected to the chamber 36 and supplied with brake fluid therefrom, the delivery line 24 for delivering oil under pressure to bore 23 when the cut-off valve 5 is in an open position as described hereinafter, and a return line 41 for returning oil from chamber 19 to the vehicle crankcase (not shown).

The vehicle lubricating oil pump device 42 is utilized to supply a pulsating pressure to oil in the delivery line 24 when so desired under the control of a selector valve device 43. Valve device 43 has a passage 44 which establishes communication between a supply line 45 and said delivery line 24 when said valve device is positioned by turning a handle 46 to "On" position shown in Fig. 1.

The gear pump 48 is a normal two gear pump having two rotating gears 49 (only one of which is shown in Fig. 2) which are included in a casing 50 to which oil is supplied from the crankcase (not shown) via an intake line (not shown) connected to the intake side of the gear pump 48 (the lower side as shown in Figs. 1 and 2). The two rotating gears 49 driven by vehicle engine means (not shown) are in mesh and rotated in opposite directions such that a pressure is built up in the oil in said casing 50 to cause said oil under pressure to be discharged on the discharge side of the gear pump 48 (the upper side as shown in Figs. 1 and 2), through a discharge line (not shown) leading to various lubricating passages and lines (not shown) for supplying lubricating oil under pressure to various bearings and other friction surfaces (not shown) of the vehicle engine.

Attached to the pump casing 50, as by bolts 51, is a gear housing 52 containing a driving gear 53 driven by a drive shaft 54 common to both the driving gear 53 and one of the pump gears 49 (shown in the drawing as the right-hand gear 49). Also contained in the gear housing 52 is a rotary valve gear 55 having gear teeth 56 as shown in Fig. 3 adapted to mesh with the driving gear and to be rotated about a shaft 57 having a concentric passage 58 therethrough. The concentric passage 58 through the shaft 57 is open through a plurality of circumferentially closely spaced holes 59 to permit constant communication thereof with an arcuate feed groove 60 through a radial channel 61 cut in one face of said gear 55. The gears 53 and 55 are maintained in place by a casing cover plate 62 secured as by bolts 63 to the gear housing 52.

Within the gear housing 52 are two passages; a relief passage 64 shown dotted in Fig. 2 and a pressure passage 65 indicated in Figs. 1 and 2. The relief passage 64 connects a port 66 in the inside face of the gear housing 52 to the intake side of the gear pump 48 and the pressure passage 65 connects a port 67 in the inside face of the gear housing 52 to the discharge side of the gear pump 48. The ports 66 and 67, as shown, are positioned in diametrical relation in the face of the gear housing 52 so as to be alternately in communication with the feed groove 60 in the rotating valve gear 55 and thence to the concentric passage 58 through the shaft 57 via the channel 61. It will be understood that the two ports 66 and 67 are merely illustrative and that a plurality of connected ports 66 and another series of connected ports 67 in alternate and uniformly spaced circumferential relationship may be employed in order to obtain any desired frequency of pressure pulsation. A supply line 45 connects the outer end of passage 58 of the shaft 57 to the selector valve device 43 so as to permit the flow of oil under pressure from the pressure passage 65 to flow through port 67, feed groove 60, channel 61, and concentric passage 58 to the selector valve device 43 when the feed groove 60 on the rotating valve gear 55 registers with the port 67. When the feed groove 60 of the rotating valve gear 55 registers with port 66, the pressure of the oil in the line 45 is relieved via passage 58, channel 61 and feed groove 60 to the relief passage 64. From the previous description, it can be seen that as the valve gear 55 rotates, the pressure of oil in the supply line 45 is alternately built up and then relieved to result in a pulsating oil pressure in said line. It will be understood that the speed at which the pump is driven is also a factor in determining the frequency of the pressure pulsations and thus the pump speed may be selected accordingly.

*Operation*

In operation, with the vehicle engine running, the shaft 54 of the gear pump 48 is rotated by gear means (not shown) connected to the vehicle engine. With the shaft 54 rotating, the gears 49 operate to pump lubricating oil from the crankcase (not shown) via intake line (not shown) past the pump gears 49 to supply oil under pressure to the discharge side of the pump 48 (the upper side as shown in Figs. 1 and 2) and the discharge line leading to the necessary elements to be lubricated, and also to the pressure passage 65 and port 67. Simultaneously with the rotation of the pump gears 49, the shaft 54 rotates the driving gear 53 to effect rotation of the rotary valve gear 55. As previously described, the concentric passage 58 of shaft 57 is in constant communication with the feed groove 60 and channel 61 via the holes 59 in the shaft 57, and therefore, as the valve gear 55 rotates, the feed groove 60 registers alternately with the port 67 to supply oil under pressure to the supply line 45 and with the port 66 to relieve the pressure in the supply line 45 via the passage 58, holes 59, channel 61, feed groove 60, port 66, and passage 64 to the intake side of the pump 48. It can thus be seen that the oil in the supply line 45 is subject alternately to a pressure from the pressure passage 65 and to that of the relief passage 64, thereby creating a pulsating oil pressure in supply line 45. This pulsating pressure in the supply line 45 is limited to the supply line 45 if the selector valve 43 is in its "Off" position and has no effect on a brake application while the selector valve is maintained in the "Off" position.

To operate the brake control apparatus when the vehicle is travelling on a low-adhesion road surface, the operator must first move the handle 46 of the selector valve 43 to an "On" position, in which position, the passage 44 connects the supply line 45 to the delivery line 24 thereby supplying oil under a pulsating pressure to said delivery line.

To initiate a brake application, the operator applies foot pressure to the brake pedal lever 9 to pivot the brake pedal lever 9 about the pivot pin 11 to cause the piston rod 8 and connected application piston 4 to move to the right (as shown in Fig. 1) in opposition to the forces of spring 37, to create a hydraulic fluid braking pressure in the chamber 36 and the brake cylinders (not shown) connected to said chamber 36 by the brake line 40, thereby applying the brakes of the vehicle. As the brake pedal lever 9 is pivoted about the pin 11, the contact plate 13 on the lower portion 12 of the brake pedal lever 9 contacts the outer end of the release plunger 14 to slidably move the plunger 14 in the bore 15 to seat the plunger 14 on the seat 20 thereby closing ports 22 and 21 and moving the releasing piston 7 to the right in the bore 17 (as shown in Fig. 1). Further foot-applied pressure to the brake pedal lever 9 effects further movement to the right of piston rod 8 and application piston 4 in the bore 35 to effect increased fluid braking pressure and cause a greater degree of brake application, and also cause further movement to the right of the plunger 14 and releasing piston 7 in the bore 17.

Simultaneously with the increase in fluid braking pressure in chamber 36 and connected brake line 40, the fluid pressure is increased in chamber 30 and passage 38 until a predetermined maximum safe fluid brake pressure is attained, at which pressure, operation of the cut-off valve 5 is effected as explained hereinafter. The maximum fluid brake pressure mentioned herein is regulated by selecting the proper force of spring 28 such that the cut-off valve 5 is open when the brake pressure is slightly less than that at which wheel slide is likely to occur.

When the described maximum fluid brake pressure is attained, the brake fluid pressure in chamber 30 is sufficient to overcome the force of spring 28, thereby moving the cut-off piston 6 and piston stem 31 downward through the bores 30 and 32 respectively so that the piston stem 31 engages the cut-off valve 5 and moves said valve downward in the bore 23 to an open position. With the cut-off valve 5 in the open position, the oil under a pulsating pressure in the delivery line 24 flows through the bore 23 to the port 25 and connected chamber 18. As previously described, when the brake application was initiated, the contact plate 13 moved the releasing plunger 14 to the right to close port 21 at the seat 20. Additionally however, the oil pressure in chamber 18 tends to move the releasing piston 7 to the left so that the port 21 will be maintained closed such that the pulsating oil pressure forces can only be transmitted by way of piston 7 and plunger 14 to the lower portion 12 of the brake pedal lever 9 in opposition to the continuous foot-applied pressure to cause pulsating of the brake pedal. This just described pulsating of the brake pedal 9 causes the piston rod 8 and piston 4 to pulsate accordingly, to effect a pulsating hydraulic brake pressure in chamber 36 and connected brake cylinder line 40 thereby providing the pulsating braking effect desired.

To release the brake application, the foot-applied pressure on the foot pedal lever 9 is removed permitting the pedal returning means, such as a return spring (not shown), to pivot the pedal lever 9 clockwise about the pin 11 to a normal brake release position in which the piston rod 8 and piston 4 are moved to the left to their normal release position, and the contact plate 13 is moved to the left out of engagement with the release plunger 14. With the piston 4 in its release position, the hydraulic pressure is removed from chamber 36 and connected brake line 40 and chamber 30 to effect a brake release and allow the spring 38 to move the cut-off valve 5, piston stem 31 and cut-off piston upward in which position the cut-off valve blanks off the delivery line 24 and port 25. With the contact plate 13 out of engagement with the plunger 14, the oil under pressure in chamber 18 will move the plunger 14 to the left in the bore 15 to open the port 22 to permit the oil in chamber 18 to drain to the crankcase (not shown) via passage 21, port 22, chamber 19 and return line 41.

It should be noted herein that if a complete brake release is not desired, but only a partial release, this may be accomplished by relieving the foot-applied pressure on the brake pedal lever 9 to a degree calling for less than the previously-mentioned predetermined maximum fluid pressure thereby closing the cut-off valve 5 and terminating the pulsating braking and maintaining the brakes applied to a degree corresponding to the foot-applied pressure. The pulsating braking will thus be effective only when the operator tends to exceed the predetermined maximum brake pressure safely applicable on low-adhesion road surfaces while the selector valve is in the "On" position.

On dry road surfaces, the operator should position the selector valve handle 46 in the "Off" position, thereby preventing the flow of pulsating oil pressure in the delivery line 24 and permitting only the usual well-known brake control entirely dependent on the foot-applied pressure exerted on the brake pedal lever 9.

Having now described the invention, what I claim as new and desire to secure by Letters Patent, is:

1. A pulsating brake apparatus comprising a brake controlling communication in which pressure of brake fluid is increased for effecting a brake application and reduced for effecting a brake release, pedal means operative by operator-applied pressure to be moved into an application zone to effect an increase in pressure of brake fluid in said brake control communication to a degree according to the degree of movement of said pedal means into the application zone, fluid pump means having a fluid intake chamber at atmospheric pressure and a fluid pressure discharge chamber from which fluid under uniform pressure is discharged, piston means effective when subjected to fluid under pressure to exert a force on said pedal means in opposition to operator-applied pressure, rotary valve means driven by said fluid pump means successively and repeatedly through one position in which the rotary valve means establishes a communication between said piston means and said pressure discharge chamber to cause application of said uniform pressure to said piston means, and through a second position in which the rotary valve means establishes communication between said piston means and said fluid intake chamber to relieve the pressure on said piston means.

2. The combination as stated in claim 1 including control means operative in response to a pressure of brake fluid in said brake control communication of less than a predetermined pressure to prevent application of pressure to said piston means.

3. A pulsating brake apparatus comprising a brake controlling communication in which pressure of brake fluid is increased for effecting a brake application and reduced for effecting a brake release, pedal means operative by operator-applied pressure to be moved into an application zone to effect an increase in pressure of brake fluid in said brake control communication to a degree according to the degree of movement of said pedal means into the application zone, fluid pump means having a fluid intake chamber at atmospheric pressure and a fluid pressure discharge chamber from which fluid under uniform pressure is discharged, piston means effective when subjected to fluid under pressure to exert a force on said pedal means in opposition to operator-applied pressure, conduit means extending between said pressure discharge chamber and said piston means, valve means operative in response to a pressure of brake fluid in said brake control communication greater than a predetermined pressure to establish communication via which fluid under pressure from said conduit means is applied to said piston means and operative in response to a pressure of brake fluid in said brake control communication of less than said predetermined pressure to cut off said communication and thereby prevent application of fluid under pressure from said conduit means to said piston means, rotary valve means driven by said fluid pump means successively and repeatedly through one position in which it establishes communication between said pressure discharge chamber and said conduit means to cause supply of said fluid under uniform pressure to said conduit means, and through a second position in which it establishes communication between said fluid intake chamber and said conduit means to relieve the pressure in said conduit means.

4. Pulsating brake apparatus as claimed in claim 3, further including a manually operated valve means interposed in said conduit means for selectively establishing or disestablishing communication therethrough.

References Cited in the file of this patent

UNITED STATES PATENTS

| | | |
|---|---|---|
| 1,207,801 | Schmidt | Dec. 12, 1916 |
| 2,270,585 | Gartner | Jan. 20, 1942 |
| 2,660,266 | Maloney | Nov. 24, 1953 |
| 2,747,697 | Banker | May 29, 1956 |
| 2,753,017 | Curl et al. | July 3, 1956 |
| 2,800,370 | Whitney | July 23, 1957 |
| 2,807,141 | Strader | Sept. 24, 1957 |
| 2,812,983 | Bush | Nov. 12, 1957 |

FOREIGN PATENTS

| | | |
|---|---|---|
| 50,803 | France | Apr. 18, 1941 |
| 543,418 | France | Feb. 25, 1942 |
| 493,697 | Great Britain | Oct. 10, 1938 |
| 676,680 | Great Britain | July 30, 1952 |
| 696,470 | Great Britain | Sept. 2, 1953 |